March 16, 1954 Z. D. RUBEN Re. 23,803

FLUID POWER UNIT

Original Filed April 10, 1944 2 Sheets-Sheet 1

INVENTOR.
ZORRO D. RUBEN
BY Morris Spector

FLUID POWER UNIT

Original Filed April 10, 1944 2 Sheets-Sheet 2

INVENTOR.
ZORRO D. RUBEN
BY Morris Spector

Reissued Mar. 16, 1954

Re. 23,803

UNITED STATES PATENT OFFICE 23,803

FLUID POWER UNIT

Zorro D. Ruben, Chicago, Ill.

Original No. 2,498,451, dated February 21, 1950, Serial No. 530,416, April 10, 1944. Application for reissue February 16, 1951, Serial No. 211,256

20 Claims. (Cl. 103—162)

Matter enclosed in heavy brackets [ ] appears in the original patent but forms no part of this reissue specification; matter printed in italics indicates the additions made by reissue.

This invention relates to power mechanisms in general and more particularly to power mechanisms which include a piston reciprocable in a cylinder for the interconversion of rotary and reciprocatory motion. In its more specific aspects this invention is applicable to pumps, compressors, fluid motors and engines.

It is one of the objects of the present invention to provide a power mechanism wherein the cylinder block with the pistons reciprocating therein is rotatable, and wherein each piston is provided with a yoke that moves with it in its combined rotary and reciprocatory motion, said yoke acting to support the side thrust which would otherwise be communicated to the piston by the driving member.

It is a further object of the present invention to provide an improved arrangement for effecting the interconversion of the rotary and reciprocatory motion, which arrangement will provide for a simple and efficient valve action in controlling the flow of fluid into or from the cylinder bore.

It is a still further object of the present invention to provide an improved and simple means for varying the output of the power unit as either by varying the stroke of the piston or by a valve control which varies the effect of a constant stroke action of the piston, the desired result being obtained either by varying the inclination of an inclined axial cam that coacts with the pistons, or by varying the timing of the valves with respect to the position of the rotary cylinder block within which the pistons are reciprocated.

It is a still further object of the present invention to provide an improved connection between a rotary shaft and a rotatable cylinder block carried thereby. In the preferred embodiment of the present invention the mechanism comprises a stationary cylinder casing from one end of which a rotary power shaft extends. Within the casing the power shaft carries a torque tube that extends approximately to the opposite end of the casing and there has a cylinder block secured thereto to be carried by the torque tube. The cylinder block in its rotation brings each cylinder bore thereof successively into communication with intake and discharge ports formed in the stationary part of the structure. In one preferred construction means is provided for varying the angle of inclination of the axial cam to vary the stroke of the pistons, thus varying the output of the mechanim. In another preferred construction the inclination of the axial cam is maintained constant but the cam is angularly adjustable with respect to the intake and discharge ports to vary the phase relationship of the reciprocatory motion of the piston and the circular motion of the cylinder block with respect to the ports. This phase relationship determines the position and direction of reciprocation of the piston at the moment that the cylinder [block] opens into communication with a port and at the moment communication with that port is closed, thus altering the output of the machine.

It is a still further object of the present invention to provide a mechanical construction wherein the cylinder block is driven by a torque tube which surrounds the inclined axial cam that controls the positions of the pistons in the cylinder bores as the cylinder block rotates.

By reason of the present construction it is possible to produce a mechanism such as, for instance, a variable displacement hydraulic pump, which is exceedingly small and light in weight for given operating pressure[;], especially pumps that operate at very high pressures, such as two thousand pounds per square inch. Also, as a result of the present construction, a small, light, high pressure pump may be built wherein the advantages of a rotary cylinder block are combined with the advantages of a structure wherein the side thrust of the pump piston against the cylinder walls is eliminated by the employment of yokes such as are used on pumps wherein the cylinder block is stationary.

The attainment of the above and further objects of the present invention will be apparent from the following specification taken in conjunction with the accompanying drawings forming a part thereof.

Figure 1:
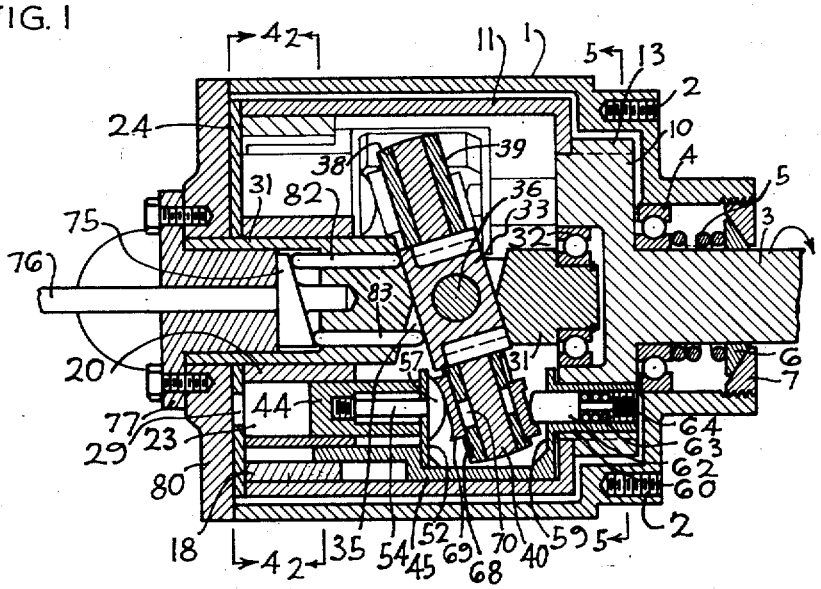
Figure 1 is a longitudinal sectional view through a pump embodying the present invention.
Figure 2:
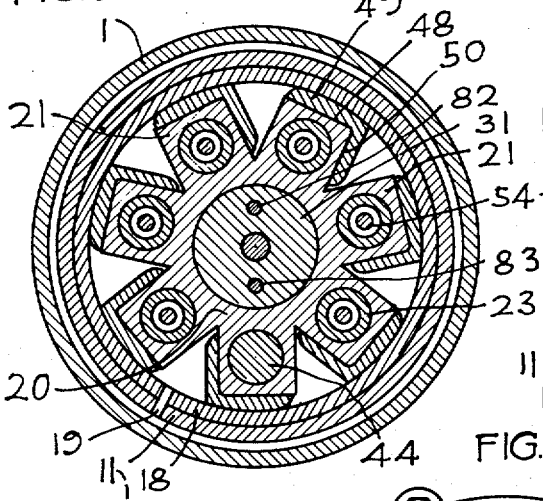
Figure 2 is a [longitudinal] sectional view taken along the line 2—2 of Figure 1 and looking in the direction of the arrows.
Figure 10:
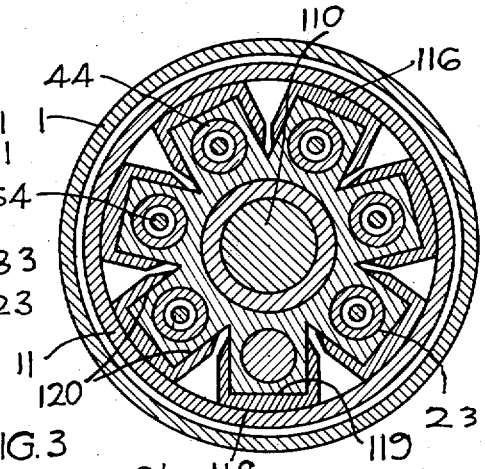
Figure 10 is a sectional view taken along the line 10—10 of Figure 9.
Figure 5:
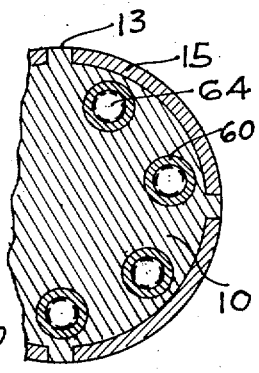
Figure 5 is a fragmentary sectional view taken along the line 5—5 of Figure 1 with the outer casing omitted.

Reference may now be had more particularly to Figure 1. The pump illustrated in Figure 1 comprises a stationary casing body 1, circular in cross section, having peripherally spaced bolt holes 2 for receiving bolts or the like for mounting the pump as desired. A rotatable shaft 3 is journalled in the body 1 in suitable bearings 4, and is constantly urged in a direction leftward, as seen in Figure 1, by a compressed coiled spring 5. A suitable shaft seal 6 held by a threaded nut 7 is provided, as is usual. Within the body 1 the shaft 3 has a circular flange 10 on which is splined a torque tube 11. To secure the torque tube to the flange 10 the flange is provided with axially extending ribs 13 (Fig. 5) that extend into slots 14 in a short neck 15 formed in the torque tube. The torque tube is thus keyed to and rotates with the shaft 3. At its forward end the torque tube 11 has a bearing bushing 18 secured thereto in any desired manner as, for instance, by means of a pin 19 (Fig. 2) that holds the bearing bushing fixed in the torque tube. A cylinder block 20 is secured in the forward end of the torque tube, in a manner to be presently described. The cylinder block is star-shaped, having a plurality of arms 21, in this instance seven, radiating from a central hub, each of which arms has a longitudinally extending cylinder bore 23 therethrough. A cylinder block cover plate 24 is secured to the cylinder block by welding. The cylinder block cover plate 24 is splined to the torque tube. For this purpose the periphery of the cover plate 24 is provided with slots 27 that receive fingers 28 at the end of the torque tube 11. The cylinder block cover plate has openings 29 therein, each of which is located over one of the cylinder bores 23.

A stationary spindle 31 coaxial with the drive shaft 3 extends through the cylinder block cover plate 24 and through the cylinder block and is journalled at its opposite end in a suitable ball bearing 32 in the flange 10 of the drive shaft 3. The spindle 31 has a cam support 33 located in a milled slot 35, being pivotally mounted therein as by a pin 36. A pair of swash plate bearings 38—39 are rotatably mounted on the cam support bearing upon a variable axial cam 40 that is keyed to the cam support 33. The variable axial cam 40 consists of a solid metallic ring or disc that fits over and is keyed to the cam support 33 which is pivoted on the pin 36 carried by the stationary spindle 31. Each swash plate bearing 38—39 consists of a ring or annulus that is free to turn on the cam support, being loosely fitted on the support and operates in sliding surface contact with the variable axial cam 40.

Figure 6:
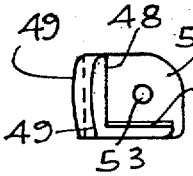
Figure 6 is an end view of a yoke of the pump of Figure 1.

Each cylinder bore 23 has a piston 44 reciprocable therein. Each piston is part of a piston and yoke assembly that cooperates with the swash plate bearings to effect reciprocation of the piston upon rotation of the torque tube carrying the cylinder block. Each yoke, indicated at 45, is of a construction such as is shown more particularly in Figures 6 and 7. Each yoke consists of a metal member including inner and outer radial bearing surfaces 48—49 and a [tangential] *circumferential* bearing surface 50. A thin flexible metal ear 52 is welded to each yoke, said ear having a perforation 53 therethrough through which extends a piston connecting rod 54. One end of the piston connecting rod is threaded into the piston, as may be seen from Figure 1. The opposite end of the connecting rod has a bearing surface 57 formed thereon said bearing surface being a portion of the surface of a sphere. The yoke has a return ear 59 that has a tubular rear yoke bearing 60 projecting therefrom. The rear yoke bearing 60 is slidably mounted in a bore in the flange 10 and has a piston return bearing stud 62 slidable therein and urged outwardly by a compression spring 63 the opposite end of which bears against a plug 64 threaded into the rear bearing 60.

The swash plate bearing 38 has a number of pockets 68 formed therein, one opposite each piston. A floater pad 69 is located in each pocket between the swash plate and the bearing surface 57 at the end of the connecting rod 54. Each swash plate also has a series of slots 70, which admit oil to the bearing surface between the swash plate and the floater pad. The circular floater pad 69 has a flat rear surface which slides in a small ellipse on the swash plate bearing, and has a front surface which is curved to receive the piston rod bearing 57. The swash plate bearing 39 is similar to the bearing 38 and also has a floater pad slidable thereon opposite each piston return bearing 62.

Each yoke bears upon and reciprocates on the inner surface of the torque tube and also slides between the bearing bushing 18 and the cylinder block. The radial and [tangential] *circumferential* bearing surfaces 48—50 slide on the cylinder block as the piston reciprocates, in a manner to be more fully described as this specification proceeds.

The spindle 31 has an axially extending bore therein in which is mounted a control cam 75 near the end of a control shaft 76 that extends through a connecting bushing 77 bolted to a connection cover 80 which is itself bolted to the casing 1 by bolts 81. The control cam 75 controls the positions of two axially slidable control pins 82—83 that bear against the cam support 33 and fix its variable angle of inclination.

The inner surface of the cover plate 80 has two arcuate grooves 86—87 therein forming ports or passageways, each of which extends through almost 180°, and which communicate with intake and outlet ports 89—90, respectively. The inner surface of the connection cover and the outer surface of the cylinder block cover are ground perfectly flat so that the cylinder block cover 24 slides on the inner surface of the connection cover 80, under pressure of the spring 5 aided by the fluid pressure within the cylinders.

Figure 7:
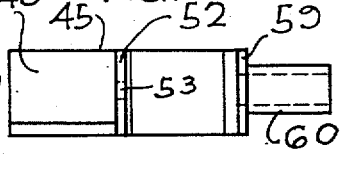
Figure 7 is a side view of the same yoke.
Figure 8:
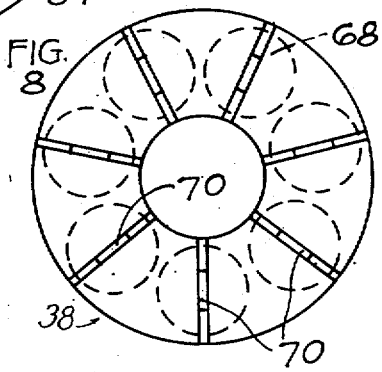
Figure 8 is a view of the cam bearing surface of the swash plate of Figure 1.
Figure 11:
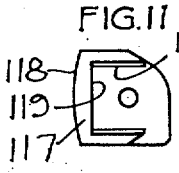
Figures 11 and 12 are, respectively, end and side views of one of the yokes used on the pump of Figure [7] *9*.
Figure 12:
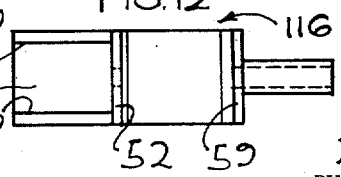

An explanation will now be given of the mode of operation of the pump of Figure 1. Rotation of the drive shaft 3 causes rotation of the torque tube 11, the yokes, the cylinder block cover plate 24, and the cylinder block 20. The spindle 31 and the axial cam carried thereby are stationary *in their adjusted position during rotation of the drive shaft*. As the cylinder block and the yokes rotate, the bearing surface 57 of each piston bears against the associated pad 69 on the swash plate and causes the piston to reciprocate. Each piston [54] *44* is moved into the cylinder by the engagement of the bearing surface 57 with its pad 69 whereas the movement of the piston outwardly of the cylinder is effected by the yoke which is moved by the bearing 62 acted on by its associated pad. The swash plates 38—39 are free to rotate on the variable axial cam 40. The friction between the swash plates and the cam 40 is made very low. The pressure of the pad or pads on the swash plates causes the swash plates to turn with the cylinder block. [One of the contacting surfaces of each swash plate with the cam 40 is shaped to form a tapered land bearing as shown in Figures 7 and 8 of my application Serial No. 490,957.] The bearing design is preferably altered to permit rotation in either direction. Each pad, such as 69, has a small elliptical movement in its cavity [69] *68* in the swash plate 38. At the same time the piston of any one cylinder commences to move outwardly in its bore the cylinder is in communication with the intake port 86 of the cover plate. When the piston reaches its outermost position the further rotation of the torque tube brings the associated cylinder bore into communication with the outlet port 87 so that upon reverse movement of the piston, that is, movement thereof into the cylinder, it discharges the contents of the cylinder through the discharge port.

To change the delivery of each cylinder per revolution of the drive shaft it is merely necessary to change the inclination of the axial cam 40, since the inclination of this cam determines the stroke of the piston. To change the angle of inclination of the cam it is merely necessary to adjust the control cam shaft 76. When the variable axial cam is in a plane at right angles to the axis of the drive shaft 3 rotation of the drive shaft will produce no reciprocation of the pistons, hence no output of the pump.

Figure 9:
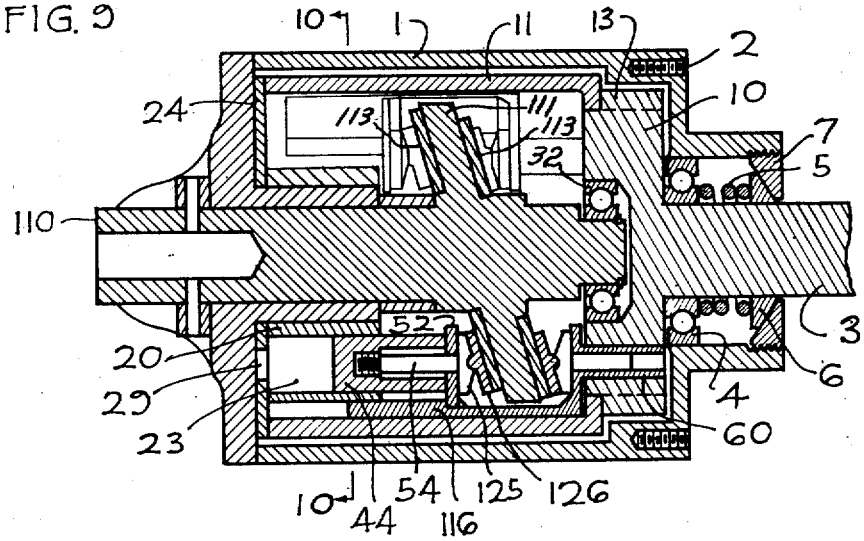
Figure 9 is a longitudinal sectional view through a pump of a modified construction embodying the present invention.

Reference may now be had more particularly to Figure [8] *9* showing a modified form of variable delivery pump wherein the stationary axial cam is at a fixed angle of inclination to the axis of rotation of the cylinder black and wherein the pump pistons have a fixed stroke, the variation in intake or delivery being effected by changing the timing relationship between the position of the piston and the opening or closing of the intake and outlet ports. Insofar as the structure of Figure 9 is the same as that of Figure 1 the same reference numerals have been used and a further description thereof is not necessary at this time. In Figure 9 the drive shaft, torque tube, and the cylinder block are of the same construction, as in the pump of Figure 1. In this pump a spindle, indicated at 110, which is angularly adjustable but is mechanically held stationary during operation of the pump, carries an axial cam 111 which has swash plates [112—113] *113—113* thereon and freely rotatable thereon. Each piston 44 is provided with a yoke 116 of a construction such as illustrated more fully in Figures *11 and 12* [10 and 11]. The yoke 116 of the pump of Figure 9 differs from that of the pump previously described essentially in that each yoke embraces three sides of an arm of the cylinder block rather than only two sides as in Figures 2. For this purpose the yoke 116 has U-shaped lugs 117 integral therewith or welded thereto which U-shaped lugs provide radial bearing surfaces 118—119 and [tangential] *circumferential* bearing surfaces 120 that embrace an arm of the cylinder block. In the pump of Figure 9 the yoke slides in its full length against the inner peripheral surface of the torque tube. The yoke 116 has ears 52—59 the same as the yoke previously described.

The piston rod 54 in the pump of Figure 9 has, at its outer end, a conical bearing surface 125 at the apex of which there is formed a ball seat or socket that receives a projection at the end of a floater pad 126 that is free to turn on the conical surface 125. The opposite face of the floater pad 126 bears against the swash plate bearing 113 and slides thereon in a small elliptical path.

Figure 3:
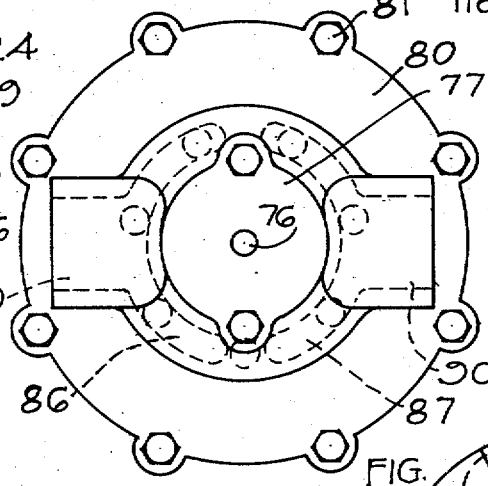
Figure 3 is an end view of the pump of Figure 2.
Figure 4:
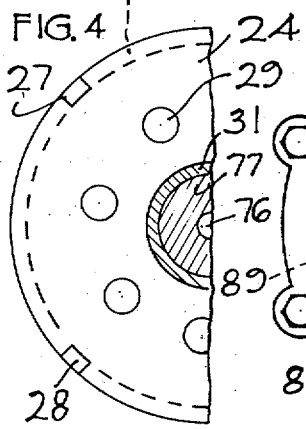
Figure 4 is a fragmentary sectional view taken along the line 4—4 of Figure 1 with the outer casing omitted.

The valve arrangement in the pump of Figure 9 is identical with that of the pump of Figure 1, the connection cover 80 being provided with fluid passageways the same as is illustrated in Figure 3.

Upon rotation of the drive shaft 3 of the pump of Figure 9 the cylinder block is rotated and the stationary axial cam 111 causes the pistons to reciprocate in the cylinder block, the length of stroke being determined by the inclination of the axial cam. Therefore each piston has a fixed stroke. During the rotation of the cylinder block each individual cylinder bore is alternately brought into communication with the intake port and the discharge port, the timing being determined entirely by the angular position of the cylinder block. In order to vary the output of the pump it is merely necessary to turn the spindle 110. Turning of the spindle 110 counter-clockwise, as viewed from the left hand side of Figure 9, will cause the piston 44 to move inwardly within the cylinder bore. Others of the pistons will move outwardly. Thus, while in Figure 9, if rotation of the shaft is assumed to be clockwise, as viewed from the right hand side of Figure 9, the piston 44 is at the end of its outward stroke at the time that the cylinder block has just passed out of communication with the inlet port and is about to pass into communication with the outlet port; a counter-clockwise adjustment of the axial cam 111 will change this relationship. When this adjustment has been made the piston will not be quite at the end of its stroke when the intake is closed and will still be making some of its intake stroke even after the discharge port is opened to the associated cylinder bore. Later, during the discharge stroke, the cylinder [block] will close its communication with the discharge port and open communication with the intake port even before the piston has reached the end of its discharge stroke. Thus only part of the full discharge of the piston will take place while the associated cylinder bore is in communication with the discharge port. By this arrangement the output [of] *or* delivery of the pump is varied. In order to get zero delivery it is merely necessary to turn the axial cam to such a position that the piston 44 will be in its mid position within the cylinder at the time that the cylinder passes from communication with the intake port to communication with the discharge port. When this condition prevails the piston 44 will draw liquid from the intake port during half of the intake stroke and will draw liquid from the discharge port during the other half of the intake stroke. During the discharge stroke the piston will discharge liquid back into the discharge port during half of the discharge stroke and will discharge liquid back into the intake port during the other half of the discharge stroke. For any other adjustment of the axial cam the piston 44 will be effective for only a fractional part of its full stroke. In view of the fact that the cylinder block contains many cylinders the pistons of which are at any one time at different positions, it may be seen that when the pump is operating at less than 100% capacity each piston may, during the ineffective fraction of its stroke, be delivering liquid to some other cylinder bore rather than to the discharge port. Thus each piston and its associated cylinder bore will act as a pump during a fraction of its stroke and, during another fraction of its stroke will be driven by pressure developed in one or more of the other cylinder bores. Because of the reversal of the direction of pressure I have found it necessary that each yoke be provided with the [tangential] *circumferential* bearing surfaces 120—120 that bear on opposite sides of the cylinder block arm. This means that the pump of Figure 9 can operate to pump liquids in either direction so that either port 89—90 may be the intake port and the other be the output or delivery port. When the mechanism is operated as a fluid motor its direction of rotation may be reversed at will while the direction of flow of fluid to the motor remains unchanged.

In compliance with the requirements of the patent statutes I have here shown and described a few preferred embodiments of my invention. It is, however, to be understood that the invention is not limited to the precise constructions here shown, the same being merely illustrative of the principles of the invention. What I consider new and desire to secure by Letters Patent is:

1. Apparatus of the class described comprising a rotatable torque tube, means at one end of the tube for rotating it, a cylinder block secured in the opposite end of the tube and rotatable therewith, a shaft extending axially through the block and around which shaft the block rotates, an inclined axial cam carried by said shaft within the tube, cylinder bores formed in the block around said shaft, pistons in said bores, said block having openings between adjacent bores, and means slidably connecting the pistons with said inclined cam, said means being slidable in said openings and supported on and rotating with the torque tube.

2. Apparatus of the class described comprising a torque tube, means at one end of the tube for rotating the tube, a cylinder block secured to the opposite end of the tube and rotated thereby, parallel cylinder bores formed in the block, pistons reciprocable in the bores, a stationary ported member against which the block slides, the cylinder bores being brought into and out of communication with the ports as the block rotates, a stationary inclined axial cam within the tube, means slidably connecting the pistons with the cam and means for adjusting the position of the cam during rotation of the torque tube to alter the output of the apparatus per revolution of the cylinder block.

3. Apparatus of the class described comprising a torque tube, means at one end of the tube for rotating the tube, a cylinder block secured to the opposite end of the tube and rotated thereby, parallel cylinder bores formed in the block, pistons reciprocable in the bores, a stationary ported member against which the block slides, the cylinder bores being brought into and out of communication with the ports as the block rotates, a stationary inclined axial cam within the tube, means slidably connecting the pistons with the cam and means for rotatably adjusting the position of the cam with respect to the ports of the ported member while maintaining its axial inclination constant thereby altering the positions of the pistons in the respective cylinder bores at the instant of covering and uncovering of the ports by the cylinder bores [so that the output of the pump is varied while the piston stroke remains constant].

4. Apparatus of the class described comprising a rotatable torque tube, means at one end of the tube for rotating it, a cylinder block secured in the opposite end of the tube and rotatable therewith, a shaft extending axially through the block and around which shaft the block rotates, an inclined axial cam within the tube, means adjustably mounting said cam on said shaft for angular adjustment about an axis at right angles to the longitudinal axis of the shaft, and means extending through said shaft for adjusting the angle of inclination of the cam with respect to the longitudinal axis of the shaft.

5. Apparatus of the class described comprising a torque tube, means for rotating the tube, a [star-shaped] cylinder block secured to one end of the tube and rotated thereby *and having projecting arms forming the block into a star-shape,* parallel cylinder bores formed in the arms of the star-shaped block, pistons reciprocable in the bores, an inclined axial cam within the tube and means slidably connecting the pistons with the cam, said *last mentioned* means extending between the tube and the respective arms and being supported in and axially slidable between the cylinder block and the torque tube.

6. Apparatus of the class described comprising a tube, a [star-shaped] cylinder block secured to one end of the tube *and having projecting arms forming the block into a star-shape,* parallel cylinder bores formed in the arms of the star-shaped block, pistons reciprocable in the bores, an inclined axial cam within the tube, means extending axially through the cylinder block for supporting the cam, and means slidably connecting the pistons with the cam, said *last mentioned* means including parts supported in and axially slidable between the tube and the arms of the cylinder block.

7. Apparatus of the class described comprising a rotatable torque tube, means at one end of the tube for rotating it, a cylinder block secured in the opposite end of the tube and rotatable therewith, a shaft extending axially through the block and around which shaft the block rotates, an inclined axial cam carried by said shaft within the tube, cylinder bores formed in the block around said shaft, pistons in said bores, means slidably connecting the pistons with said inclined cam, ports for said cylinders, means for turning the cam about the axis of rotation of the torque tube while maintaining its angle of inclination with respect to said axis constant, to alter the position of the cam with respect to the ports, and means for locking said cam in its adjusted position while permitting rotation of the torque tube.

8. A rotary pump comprising a casing, a ported end member closing one end of the casing and having a port opening on the inside of the casing, a rotatable torque tube in the casing, a cylinder block at one end of the torque tube and rotated thereby in sliding engagement with the ported end member, said block having cylinder bores extending from that surface of the block which is in sliding engagement with the ported end member and movable by the rotation of the tube into and out of communication with the port of the member, means at the opposite end of the torque tube for rotating the torque tube, a stationary inclined axial cam entirely within the torque tube between said last named means and the cylinder block, adjustable means extending centrally through the block for supporting and holding the cam in adjustable relationship with respect to the ported member, pistons reciprocable in the cylinder bores, and means for slidably connecting the pistons with the cam whereby the cam causes reciprocation of the pistons upon rotation of the torque tube and the cylinder block, said connecting means including supporting yokes sliding on the torque tube and supporting the pistons.

9. A rotary pump comprising a casing, an end plate member for the casing, said member having a port therein opening on the inside of the casing, a rotatable cylinder block on the inside of the casing and in sliding contact with the end plate member, means for rotating the block, said block having a cylinder bore therein eccentric with respect to the axis of rotation of the block and which is brought into and out of communication with said port as the block rotates, a piston reciprocable in the cylinder bore, an inclined axial cam in the casing for reciprocating the piston as the cylinder block is rotated, and means for rotatably adjusting the position of the cam with respect to the port while maintaining its inclination constant with respect to the axis of rotation of the cylinder block thereby altering the positions of the piston in the cylinder bore at the instant of covering and of uncovering of the port by the cylinder block, [so that the output of the pump is varied while the piston stroke remains constant].

10. Apparatus of the class described comprising a tube *at least one end of which is open*, a plate secured to the tube and extending across one open end of the tube, a star-shaped cylinder block located in the tube with its center coincident with the longitudinal axis of the tube, cylinder bores in the respective arms of the star-shaped block, the longitudinal axes of said bores being parallel to the longitudinal axis of said [tubes] *tube*, said block being secured to said plate, and ports leading to the cylinder bores.

11. In combination a [star-shaped] cylinder block *having projecting arms forming the block into a star-shape*, parallel cylinder bores formed therein, ports leading to the cylinder bores, means forming a radially outwardly extending flange around the block and united therewith, a tube within which the block extends and from which the arms of the block are spaced by the flange, the flange being secured to the tube.

12. In combination a [star-shaped] cylinder block *having projecting arms forming the block into a star-shape*, parallel cylinder bores formed therein, means forming a radially outwardly extending flange around the block and united therewith, a tube within which the block extends and from which the arms of the block are spaced by the flange, the flange being secured to the tube, pistons in the bores, ports leading to the cylinder bores, an inclined axial cam in the tube, means slidably connecting the pistons with the cam, said means including parts extending between and supported in the space between the block and the tube and slidable in said space in a direction parallel with the longitudinal axes of the bores.

*13. An axial cam mechanism comprising an enclosing casing having means forming a surface having port openings on the interior of the casing, a cylinder block in the casing, said block having cylinders formed therein and having port openings in one end surface of the block being in communication with the respective cylinders, said end surface of the block being in engagement with the first mentioned surface and the port openings in the block positioned to communicate with the said port openings in the casing upon relative movement between the casing and block, a cam support member carried by said casing and extending through a hole in said cylinder block, an axial cam supported by said support member, pistons in said cylinders, means forming a pressure transmitting connection between the pistons and said cam, and means forming a driving connection with said cylinder block around the periphery of said axial cam, by means of which power is translated between the pistons in said cylinders and said driving connection.*

*14. An axial cam mechanism comprising an enclosing casing having means forming a surface having port openings on the interior of the casing, a cylinder block in the casing, said block having cylinders formed therein and having port openings in one end surface of the block being in communication with the respective cylinders, said end surface of the block being in engagement with the first mentioned surface and the port openings in the block positioned to communicate with the said port openings in the casing upon relative movement between the casing and block, a cam support member carried by said casing and extending through a hole in said cylinder block, an axial cam supported by said support member, pistons in said cylinders, means forming a pressure transmitting connection between the piston and said cam, means forming a driving connection with said cylinder block around the periphery of said axial cam, by means of which power is translated between the pistons in said cylinders and said driving connection, and a supporting radial bearing for the cam support member, said bearing being between the cam support member and the means forming the driving connection.*

*15. An axial cam mechanism comprising a stationary enclosing casing, a cam-supporting member extending inwardly from and locked to one end of the casing, an axial cam, centrally pivoted on said member, an adjusting member extending inwardly from the casing and located and supported within said supporting member, and means responsive to movement of the adjusting member to vary the inclination of the cam on said supporting member.*

*16. An axial cam mechanism comprising an enclosing casing having means forming a surface having port openings on the interior of the casing, a cylinder block in the casing, said block having cylinders formed therein and pistons in the cylinders and having port openings in one end surface of the block being in communication with the respective cylinders, said end surface of the block being in engagement with the first mentioned surface and the port openings in the block positioned to make fluid communication with said port openings in the casing upon relative movement between the casing and block, a cam-supporting member within the casing, an inclined axial cam supported by said member within the casing, a tubular driving member for the cylinder block, said tubular driving member being connected to the cylinder block and surrounding the cam, and a rotary bearing member between said tubular member and said cam supporting member.*

*17. An axial cam mechanism comprising an enclosing casing having means forming a surface having port openings on the interior of the cas-*

*ing, a cylinder block in the casing, said block having cylinders formed therein and pistons in the cylinders and having port openings in one end surface of the block being in communication with the respective cylinders, said end surface of the block being in engagement with the first mentioned surface and the port openings in the block positioned to make fluid communication with said port openings in the casing upon relative movement between the casing and block, a cam-supporting member within the casing, an inclined axial cam supported by said member within the casing, a tubular driving member for the cylinder block, said tubular driving member being connected to the cylinder block and surrounding the cam, cam follower means riding on said cam and coupled to said pistons for imparting translatory motion to said pistons as the cylinder block is driven by said tubular driving member, and yielding means exerting an axial force between the casing and said tubular member to urge the cylinder block ported surface against the said first mentioned surface.*

*18. An axial cam mechanism comprising an enclosing casing having means forming a surface having port openings on the interior of the casing, a cylinder block in the casing, said block having cylinders formed therein and pistons in the cylinders and having port openings in one end surface of the block being in communication with the respective cylinders, said end surface of the block being in engagement with the the first-mentioned surface and the port openings in the block positioned to make fluid communication with said port openings in the casing upon relative movement between the casing and block, a cam-supporting member within the casing, an inclined axial cam supported by said member within the casing, a tubular driving member connected to the cylinder block, said tubular driving member being connected to the cylinder block and surrounding the cam, cam follower means riding on said cam and coupled to said pistons for imparting translatory motion to said pistons as the cylinder block is driven by said tubular driving member, a rotary bearing member between said tubular member and said casing, and spring means exerting an axial force between the casing and said tubular member through a portion of said rotary bearing and in a direction to urge the cylinder block ported surface against the said first mentioned surface.*

*19. An axial-cam type fluid pressure energy translating mechanism comprising a rotatable cylinder block, a valve head member having an arcuately ported valve surface with fluid inlet and outlet ports thereat, said block having cylinders formed therein substantially parallel to each other and to a central axis, said cylinders having port openings in one end surface of the block which surface is slidably engaged with the arcuately ported valve surface, said last mentioned port openings positioned to communicate with said fluid inlet and outlet ports through said arcuately ported valve surfaces of said valve head member upon relative movement between the block and valve head member, a stationary cam support member carried by said valve head member and extending through an axial opening in said cylinder block, an axial cam supported by said cam support member, and pistons in said cylinders co-acting with said cam so as to reciprocate in their respective cylinders as the cylinder block rotates.*

*20. An axial-cam type fluid pressure translating mechanism comprising a valve head member at one end of the mechanism, a driving member at the opposite end and between the two a cylinder block and an axial cam, said valve head member having an arcuately ported valve surface with fluid inlet and outlet ports thereat, the cylinder block being between the valve head member and the cam and having parallel cylinder bores therethrough formed around a central axis which have openings at one end communicable with said fluid inlet and outlet ports through said arcuately ported valve surfaces of said valve head member, said cylinder block terminating in a surface which slidably engages the arcuately ported valve surface, pistons in said cylinders co-acting with said cam to reciprocate as the cylinder block is rotated, a driving connection from said driving member to said cylinder block, a casing through which the driving member extends and which is secured to the valve head member, and means urging the cylinder block towards the valve head, said cam being between said last named means and said cylinder block.*

ZORRO D. RUBEN.

References Cited in the file of this patent or the original patent

UNITED STATES PATENTS

| Number | Name | Date |
|---|---|---|
| 1,427,740 | Johnson | Aug. 29, 1922 |
| 1,428,876 | Bollinckx | Sept. 12, 1922 |
| 1,746,335 | Boyle | Feb. 11, 1930 |
| 1,822,064 | Sorensen | Sept. 8, 1931 |
| 1,826,325 | Paul | Oct. 6, 1931 |
| 1,938,735 | Andrews | Dec. 12, 1933 |
| 1,945,391 | Benedek | Jan. 30, 1934 |
| 1,947,902 | De Stoutz | Feb. 20, 1934 |
| 2,071,672 | Whitcomb | Feb. 23, 1937 |
| 2,138,194 | Pfauser | Nov. 29, 1938 |
| 2,161,143 | Doe et al. | June 6, 1939 |
| 2,188,035 | Dauster | Jan. 23, 1940 |
| 2,236,237 | Hulsebos | Mar. 25, 1941 |
| 2,241,701 | Doe | May 13, 1941 |
| 2,284,109 | Vickers | May 26, 1942 |
| 2,345,446 | Baker | Mar. 28, 1944 |